(12) United States Patent
Lesther et al.

(10) Patent No.: US 7,303,044 B2
(45) Date of Patent: Dec. 4, 2007

(54) ELECTRO-HYDRAULIC POWER STEERING ASSIST SYSTEM FOR AN AUTOMOBILE

(75) Inventors: Nicaïse Lesther, Creteil (FR); Francois Caresche, Etiolles (FR); Gabriel Chaigne, Saint-Maur des Fosses (FR)

(73) Assignee: Hydroperfect International, Chennevieres sur Marne (FR)

( * ) Notice: Subject to any disclaimer, the term of this patent is extended or adjusted under 35 U.S.C. 154(b) by 216 days.

(21) Appl. No.: 11/012,730

(22) Filed: Dec. 16, 2004

(65) Prior Publication Data
US 2005/0183901 A1    Aug. 25, 2005

(30) Foreign Application Priority Data
Dec. 18, 2003    (FR)    ................... 03 14944

(51) Int. Cl.
*B62D 5/06*    (2006.01)
(52) U.S. Cl. .................................... 180/422
(58) Field of Classification Search ............... 180/421, 180/422
See application file for complete search history.

(56) References Cited

U.S. PATENT DOCUMENTS

| 4,392,540 A | 7/1983 | Michio et al. |
| 5,762,159 A | 6/1998 | Matsuoka et al. |
| 2006/0108172 A1* | 5/2006 | Watanabe .................. 180/422 |

FOREIGN PATENT DOCUMENTS

| JP | 9-95251 | 4/1997 |
| JP | 11-227620 | 8/1999 |
| JP | 2002-154449 | 5/2002 |

* cited by examiner

Primary Examiner—Kevin Hurley
(74) Attorney, Agent, or Firm—Leydig, Voit & Mayer, Ltd.

(57) ABSTRACT

An electro-hydraulic power steering system for a vehicle includes a booster pump rotated by an electric motor, under control of a computer, as a function of a signal representing speed of the vehicle and a signal representing rate of steering wheel angle change. The computer generates the signal representing the rate of steering wheel angle change by computation from current supplied to the motor to control the booster pump.

5 Claims, 3 Drawing Sheets

ELECTRO-HYDRAULIC POWER STEERING ASSIST SYSTEM FOR AN AUTOMOBILE

BACKGROUND

The invention relates to an electro-hydraulic power steering system, for an automobile with a steering wheel, rotationally connected with a steering column, intended for determining the orientation of the steered wheels of the vehicle, through a steering device with an integrated hydraulic cylinder the system having a booster pump rotated by an electric motor controlled by a computer as a function of a signal representing the speed of the vehicle and a signal representing the rate of steering wheel angle change.

In known systems of this type, the signal representing the rate of steering wheel angle change is provided by an angle sensor. These known systems have the disadvantage that the presence of such a sensor considerably increases the cost of the system.

SUMMARY OF THE INVENTION

The present invention aims to remedy this disadvantage.

To achieve this objective, a power assist system according to the invention includes a device generating a signal representing the rate of steering wheel angle change is a device suitable for establishing this signal from the current drawn by the motor controlling the booster pump.

According to one feature of the invention, the invention, signal is derived from the rate of change of the current consumption of the electric motor.

BRIEF DESCRIPTION OF DRAWING FIGURES

The invention will be better understood, and other aims, characteristics, details and advantages of it will appear more clearly, in the following explanatory description given with reference to the appended diagrammatic drawings, provided only by way of example, illustrating an embodiment of the invention, and in which.

Figure 2:
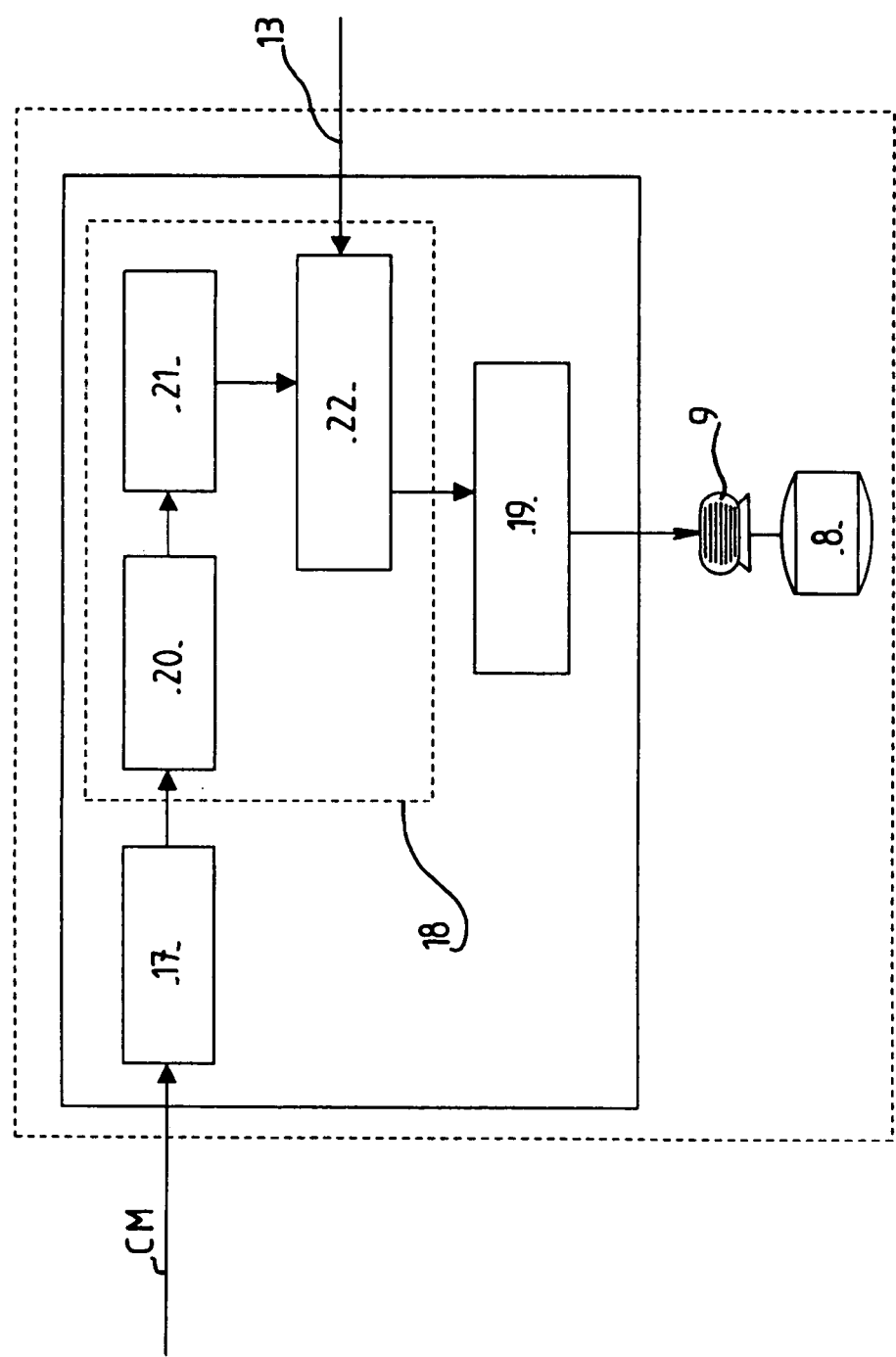
FIG. 2 is the overview diagram of the computer of the power assist system according to FIG. 1.
Figure 3:
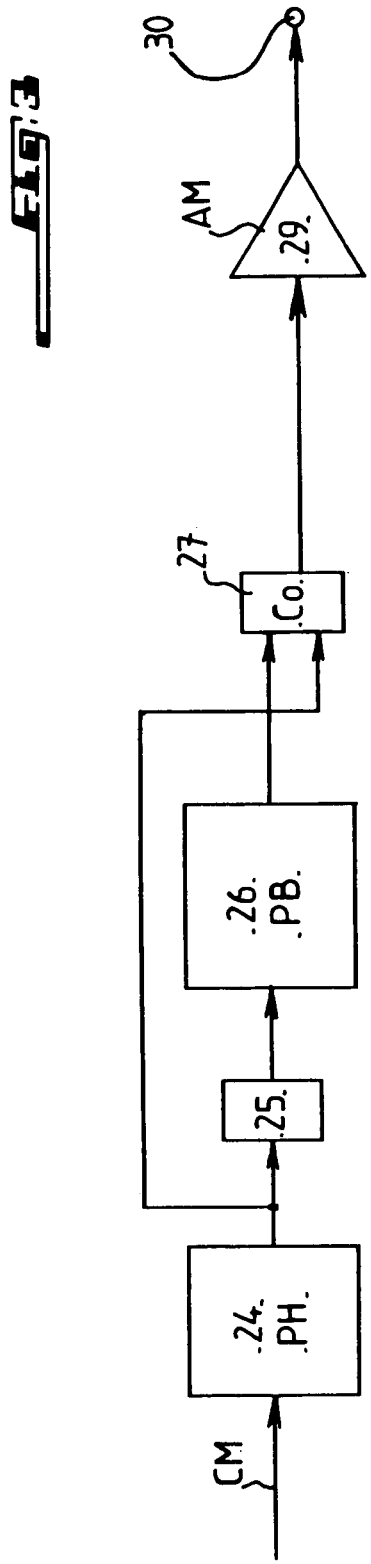
Figure 4:
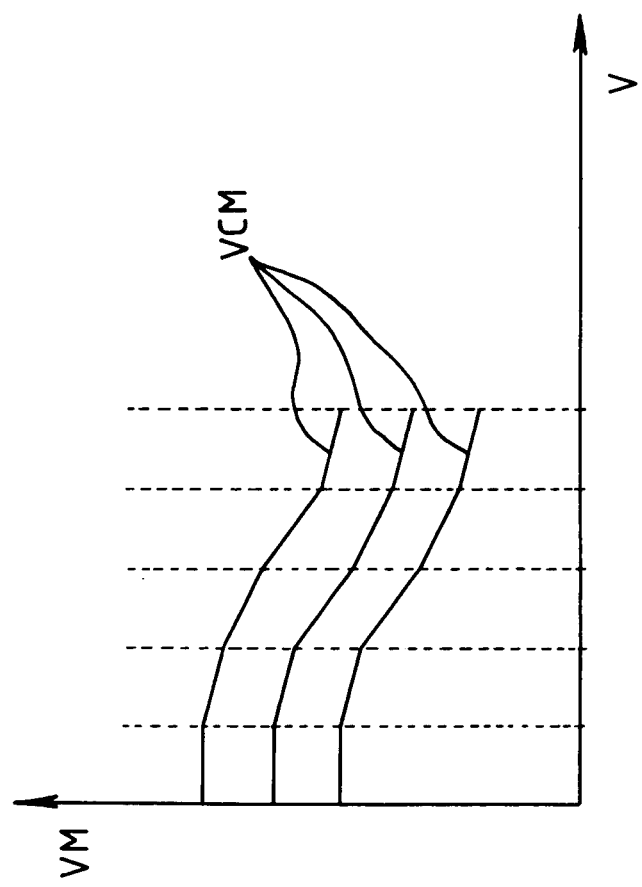

FIG. 3, in the form of a block diagram, represents the process for computing the speed of the steering wheel as executed by the computer according to FIGS. 2, and FIG. 4, illustrates as characteristic curves the relationship between the vehicle speed V and the rotational speed VM of the motor driving the pump of the power assist system as well as the different levels of the rate of motor current change VCM, which are indicated as parameters.

DETAILED DESCRIPTION

Figure 1:
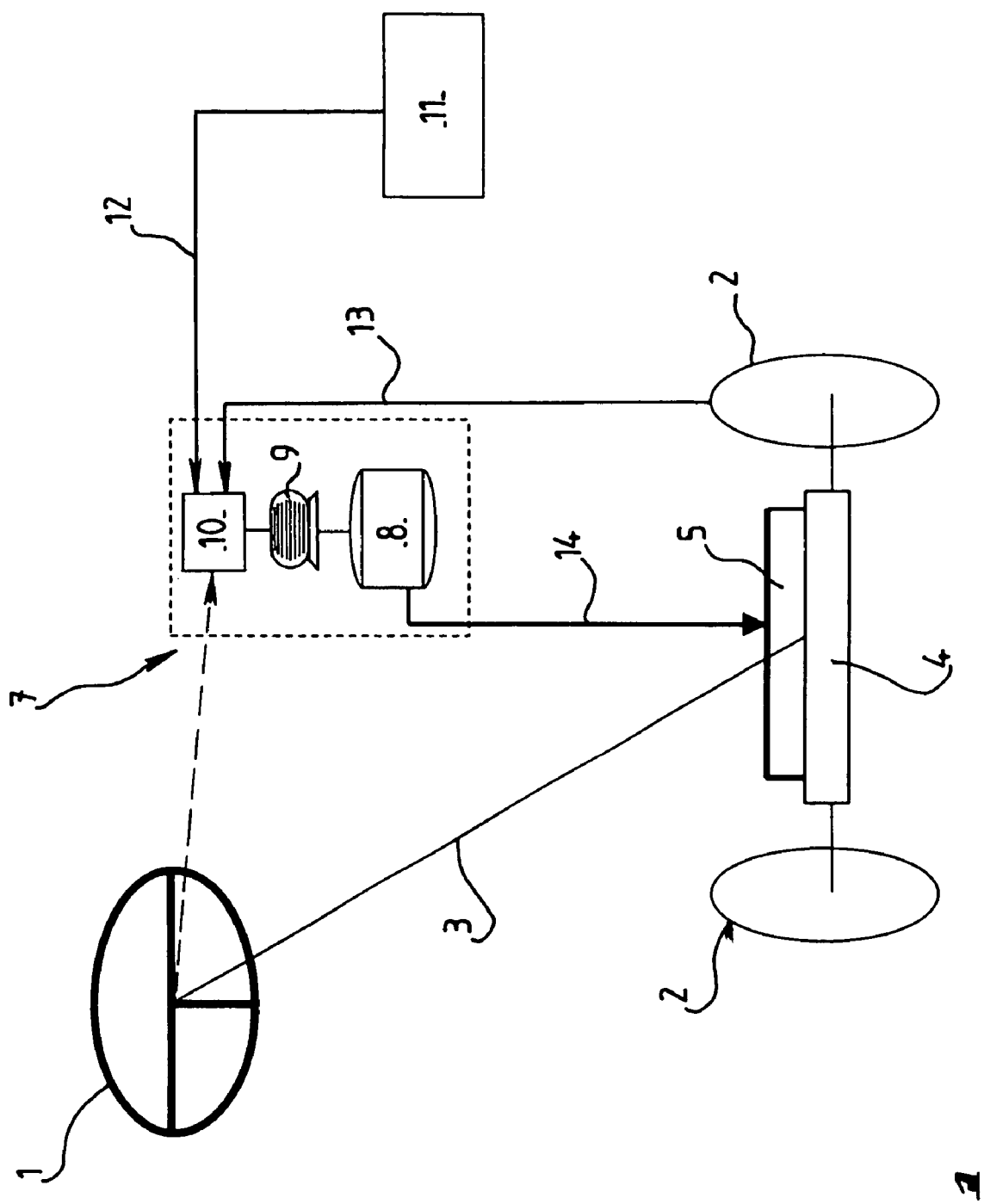
FIG. 1 is an overview diagram of an electro-hydraulic power steering system for an automobile, according to the invention.

FIG. 1, in the form of an overview diagram, presents the general structure of an electro-hydraulic steering power assist system for an automobile. As illustrated by the figure, steering wheel 1 of the vehicle enables the driver of a vehicle to orient steered wheels 2 of the vehicle via the steering column indicated by 3 and mechanical steering device 4 with integrated hydraulic cylinder 5. This cylinder is controlled by electro-pump unit 7 which essentially includes hydraulic pump 8, motor 9 for driving the pump, and computer 10. The function of the latter is, among other things, to drive motor 9 such that the motor is supplied with electrical energy from battery 11, via computer 10, as is illustrated by arrow line 12. Arrow line 13 indicates that computer 10 receives information concerning vehicle speed via a vehicle speed sensor, which is not specifically represented. Arrow line 14 symbolizes the hydraulic circuit connecting cylinder 5 to pump 8.

Since the general structure just described is itself known, it is not necessary to describe it in more detail.

Described in the following with reference to FIG. 2 is what specifically results from the invention and enables one to replace the angle sensor which is typically associated with steering wheel and functions to send computer 10 information concerning the angular speed of steering wheel 1. Given that the system according to the invention no longer needs such a sensor, its function is only indicated by dashed arrow line which is also crossed out in order to clearly show the elimination of this sensor.

With reference to FIG. 2, which illustrates as an overview diagram the various functions of computer 10 in implementing the invention, it can be seen that the computer has means 17 for shaping current CM provided by battery 11, microprocessor 18 for computing from the signal received from shaping means 17 the corresponding angular speed of the steering wheel and the motor instruction to then be applied to motor 9 after having been shaped by circuit 19. More precisely, microprocessor 18 proceeds to shape at 20 the information received from circuit 17. After this shaping, microprocessor 18 computes at 21 the angular speed of the steering wheel and at 22 computes the motor speed instruction as a function of the information concerning the speed of the vehicle, as is diagrammatically illustrated by arrow line 13.

FIG. 3 shows in more detail the establishment of the control from the current CM provided by the battery.

As shown in this figure, current Cb is first run through high-pass filter PH designated by 24; the absolute value of the signal output from the filter is then computed at 25, and filtering is done by means of an estimating filter, designated by 26, realized in the form of low-pass filter PB. The signal output from this filter PB can be applied to comparator CO bearing reference 27 which receives the output signal from high-pass filter PH at a second input. The output signal from the comparator is transmitted via amplifier AM, designated by 29, to output terminal 30. The signal available at this terminal is representative of the angular speed of the steering wheel; in the context of FIG. 2, it is the signal at the output of box 21.

More precisely, the high-pass filter is advantageously a filter of the Butterworth or an equivalent type, and is used to eliminate the direct current component. This filter could be a fourth order filter defined by the following formula $$S(n) = A3 \times S(n-3) + A2 \times S(n-2) + A1 \times S(n-1) + B3 \times E(n-3) + B2 \times E(n-2) + B1 \times E(n-1) + B0 \times E(n)$$

Here, A and B are coefficients, E is an input value, and n indicates that it pertains to the processing operation in progress done by the computer, an operation of reading the current consumption of the motor and processing by the microprocessor that is done at predetermined intervals, for example, every millisecond.

For example, the coefficients could have the following values:

A1=0,9509253;
A2=0;
A3=0;
B0=0,97546137;
B1=0,97546137;
B2=0;
B3=0;

These coefficients will be stored in a memory of the EEPROM type so as to be accessible and modifiable. The high-pass filter must have unity gain.

The estimating filter or low-pass filter PB 26 is preferably also a filter of the Butterworth or an equivalent type, and its function is to eliminate the high frequency noise and to create a memory effect on the signal for the purpose of making it possible to create a return torque of the steering wheel which corresponds to the assisting torque just provided by the system.

This filter can be defined by the following expression of a fourth order filter:

$$S(n)=A3.S(n-3)+A2.S(n-2)+A1.S(n-1)+B3.E(n-3)+B2.E(n-2)+B1.E(n-1)+B0.E(n)$$

A and B again represent coefficients that are advantageously stored in a memory of the EEPROM type so as to be modifiable. The filter has unity gain. For example, the coefficients could have the following values:

A1=0,3894033;
A2=0,31848063;
A3=0,24487242;
B0=0,00927732;
B1=0,02734368;
B2=0,01611324;
B3=−0,00537108

The function of comparator CO 27 is to compare the signals output from filters PH and PB, and it produces as its output the higher signal of the two. This comparator makes possible a variation of the reactivity of the system. Thus, a gain greater than 1 is applied to the signal of the high-pass filter in order to increase the reactivity. This gain is variable as a function of the speed of the vehicle and will be stored and modifiable in a memory of the EEPROM type.

The gain values matched to the speeds of the vehicle are stored in a matrix which, for example, has six specific values; the other values can be determined by extrapolation, for example, linear extrapolation.

The processing of the current provided by battery 11 as described in the preceding enables one to obtain a parameterizing matrix, as represented in the following, which has a certain number of points indicating, for values of the vehicle speed V in km/h indicated in the left column and values of the angular speed in °/sec obtained by computation and indicated in the upper row, the associated values of the rotational speed VM of motor 9 for driving pump 10.

Rotational Speed of Booster Motor (rpm)

| Vehicle Speed | Angular Speed [°/sec] | | | | | |
|---|---|---|---|---|---|---|
| [Km/h] | 0 | 133 | 268 | 375 | 597 | 852 |
| 0 Km/h | 3600 | 3717 | 4438 | 4844 | 4814 | 4737 |
| 25 Km/h | 3300 | 3417 | 4087 | 4535 | 4751 | 4751 |
| 50 Km/h | 3100 | 3217 | 3736 | 4310 | 4575 | 4772 |
| 100 Km/h | 2000 | 2117 | 2697 | 3335 | 4253 | 4772 |
| 140 Km/h | 1500 | 1583 | 1827 | 2409 | 3474 | 4604 |
| 250 Km/h | 900 | 1017 | 1500 | 2100 | 3165 | 4407 |

The points indicated in the matrix constitute control points which can be chosen arbitrarily and make it possible to establish intermediate values by extrapolation, for example, linear extrapolation, from the bearing values. The choice of the control points can be done judiciously as a function of the desired precision of response of the power assist system in certain ranges of vehicle speed values. In effect, it is from this matrix that the microprocessor determines the rotational speed that is appropriately imparted to motor 9 such that pump 8 driven by the motor can provide the appropriate power assist.

FIG. 4, through a series of characteristic curves, each for a parametric rate of motor current change VCM, illustrates the relationship between the rotational speed VM of the pump motor and the speed V of the vehicle, each curve forming a broken line; the points of change of direction are the control points of the matrix.

It should be noted that in FIG. 4, the extreme lower and upper curves are curves indicating the minimum and maximum power assist speeds provided by the motor. The lower curve indicates the idling motor speed when the rate of motor current change is zero and no power assist is required; the upper curve represents the maximum power assist.

With regard to the operation of the system according to the invention, a power assist demand is detected from the current consumption of motor 9 for driving pump 8. During operation of the steering wheel, the motor load increases, and the consumption of current also increases as a function of this increase in load. This makes it possible to detect a power assist demand without the necessity of an angle sensor, and makes it possible to obtain the appropriate level of power assist. More precisely, as long as the driver of the vehicle does not operate the steering wheel, the motor of the power assist pump rotates without load at an idling speed that varies as a function of the speed of the vehicle. Subsequent to operation of the steering wheel and a consequent power assist demand, the booster motor turns at an appropriate power assist speed which varies as a function of the speed of the vehicle and the rate of change of the motor current. When the system observes that there is no longer a power assist demand, the motor returns to its initial idling speed.

It should be noted that various modifications can be made to the system as described and represented. For example, the computation of the angular speed of the steering wheel done by the microprocessor could be done in any other appropriate way, and in the context of the computation just described as an example, the filtering functions could be done according to any other filtering expression different from that given above, and the coefficients in these expressions could be chosen to have any other appropriate value.

The invention claimed is:

1. An electro-hydraulic power steering system for a vehicle with a steering wheel rotationally connected with a steering column for determining orientation of steered wheels of the vehicle, through a steering device with an integrated hydraulic cylinder, said system comprising:
   a computer;
   an electric motor; and
   a booster pump rotated by the electric motor, which is controlled by the computer, as a function of a signal representing speed of the vehicle and a signal representing rate of steering wheel angle change, wherein the computer
      derives the signal representing the rate of steering wheel change from rate of change in current flowing to the electric motor, and
      uses the signal representing the rate of steering wheel angle change to control the current flowing to the electric motor, thereby controlling rotation of the booster pump.

2. An electro-hydraulic power steering system for a vehicle with a steering wheel rotationally connected with a steering column for determining orientation of steered wheels of the vehicle through a steering device with an integrated hydraulic cylinder, said system comprising:
   a computer;
   electric motor; and
   a booster pump rotated by the electric motor, which is controlled by the computer, as a function of a signal representing speed of the vehicle and a signal representing rate of steering wheel angle change, wherein the computer
      derives the signal representing the rate of steering wheel angle change from rate of change in the current flowing to the electric motor,
      establishes the signal representing the rate of steering wheel angle change by application of high-pass and low-pass filter functions to current flowing to the motor, and
      uses the signal representing the rate of steering wheel angle change to control the current flowing to the electric motor, thereby controlling rotation of the booster pump.

3. The system according to claim 2, wherein the computer compares output signals from the high-pass filter function and from the low-pass filter function and selects the higher of the output signals.

4. The system according to claim 2, wherein the computer applies a gain to the output signal of high-pass filter function, the gain varying as a function of the speed of the vehicle, to modify reactivity of the system.

5. The system according to claim 3, wherein the computer applies a gain to the output signal of high-pass filter function, the gain varying as a function of the speed of the vehicle, to modify reactivity of the system.

* * * * *